US009956713B2

(12) United States Patent
Huettner

(10) Patent No.: US 9,956,713 B2
(45) Date of Patent: May 1, 2018

(54) DEVICE FOR PROCESSING PREFORMS—FAST CHANGER

(75) Inventor: Gerald Huettner, Vilseck (DE)

(73) Assignee: KRONES AG (DE)

( * ) Notice: Subject to any disclaimer, the term of this patent is extended or adjusted under 35 U.S.C. 154(b) by 858 days.

(21) Appl. No.: 13/227,463

(22) Filed: Sep. 7, 2011

(65) Prior Publication Data

US 2012/0064184 A1 Mar. 15, 2012

(30) Foreign Application Priority Data

Sep. 9, 2010 (DE) .......................... 10 2010 044 831

(51) Int. Cl.
*B29C 49/42* (2006.01)
*B29C 49/64* (2006.01)
*B29C 49/06* (2006.01)

(52) U.S. Cl.
CPC .......... *B29C 49/42* (2013.01); *B29C 49/6436* (2013.01); *B29C 49/06* (2013.01)

(58) Field of Classification Search
CPC .......... B29K 2105/258; B29K 2101/12; B29L 2031/7158; B29L 2031/712; B29L 2023/22; B29C 49/06; B29C 49/48; B29C 49/28; B29C 49/30; B29C 2049/4807; B29C 2049/563; B29C 49/4205; B29C 2049/4226; B29C 49/4268; B29C 2049/4294
USPC .... 264/537, 328.1, 523, 40.6, 40.1; 425/522
See application file for complete search history.

(56) References Cited

U.S. PATENT DOCUMENTS

| 4,351,631 | A | 9/1982 | Gessner et al. |
| 4,380,526 | A | 4/1983 | Agrawal |
| 5,869,110 | A | 2/1999 | Ogihara |
| 6,729,868 | B1 * | 5/2004 | Vogel ...................... B29C 49/56 425/195 |
| 2006/0290035 | A1 | 12/2006 | Yoshiike et al. ............... 264/537 |
| 2009/0136613 | A1 * | 5/2009 | Linke et al. .................. 425/541 |
| 2009/0155400 | A1 * | 6/2009 | Miller ................... B29C 33/306 425/183 |

(Continued)

FOREIGN PATENT DOCUMENTS

| DE | 20 57 298 A | 6/1972 |
| DE | 10 2006 026 885 A1 | 1/2007 |

(Continued)

OTHER PUBLICATIONS

German Search Report from priority application No. 10 2010 044 831.1, dated Jun. 6, 2011.

(Continued)

*Primary Examiner* — Matthew J Daniels
*Assistant Examiner* — Leith S Shafi
(74) *Attorney, Agent, or Firm* — Hayes Soloway P.C.

(57) ABSTRACT

A device for processing performs may include at least a holder device for holding at least one preform and for at least temporary contacting arrangement of at least one wall part of the preform on at least one contact device. By the at least one contact device, a temperature of the first wall part can be prespecified, which at least temporarily differs from the temperature of a second wall part that is always spaced from the contact device. The contact device may be releasably held by a carrier device forming at least in parts a holding zone for the contact device.

12 Claims, 7 Drawing Sheets

(56) References Cited

U.S. PATENT DOCUMENTS

2010/0159056 A1* 6/2010 Toutoux et al. ............. 425/150
2010/0289178 A1   11/2010 Stoiber et al.
2012/0091634 A1*  4/2012 Meinzinger ........... B29C 33/305
                                                   264/523

FOREIGN PATENT DOCUMENTS

| DE | 102009005142 | * | 7/2010 | ............. B29C 33/04 |
| DE | 10 2009 021 792 A1 | | 11/2010 | |
| EP | 1 306 194 A2 | | 5/2003 | |
| EP | 2 253 452 A1 | | 11/2010 | |
| GB | 1 357 357 A | | 6/1974 | |
| GB | 2 474 027 A | | 4/2011 | |
| JP | 63-207630 A | | 8/1988 | |
| JP | 8-174552 A | | 7/1996 | |

OTHER PUBLICATIONS

European Search Report dated Apr. 30, 2014, issued in corresponding European Application No. 11180304.5.
European Office Action issued in application No. 11 180 304.5, dated Sep. 12, 2016 (13 pgs).
Chinese Office Action dated Apr. 8, 2015, issued in corresponding Chinese Application No. 201110263778.8.
Chinese Office Action dated Apr. 8, 2015, issued in corresponding Chinese Application No. 201110263778.8 (2 pgs).

* cited by examiner

DEVICE FOR PROCESSING PREFORMS—FAST CHANGER

CROSS-REFERENCE TO RELATED APPLICATION

This application claims the benefit of priority of German Patent Application No. 10 2010 044 831.1, filed Sep. 9, 2010, pursuant to 35 U.S.C. 119(a)-(d), the disclosure of which is incorporated herein by reference.

TECHNICAL FIELD

The present disclosure concerns a device for processing preforms, in particular for production of plastic containers.

BACKGROUND

Devices and methods for processing performs for production of plastic containers have been known for some time from the prior art. Plastic preforms made for example from PET, usually with circular cross section, are first heated and then expanded within a blow mould into plastic containers. During this expansion process the plastic containers are pressurised with compressed air in order to be thus expanded against the inner wall of the blow mould.

However sometimes plastic containers are required on the market which do not have a circular cross section but have a different cross section, such as for example an oval base shape. Several methods for production of such plastic containers are also known from the prior art. Thus it is known for example that certain regions of the outer wall of the plastic preform are heated more greatly so that they expand further in the subsequent stretch blowing process, so that overall a bottle form deviating from the circular cross section is produced. This process is also known in the prior art as "preferential heating".

Japanese patent publication JP 08174552 A discloses a blow mould device. Heat-insulating reinforcing materials are used so that the mould as a whole has a double structure. Furthermore heating devices and water bores for cooling water are provided. Japanese publication JP 63207630 A also describes a possibility of controlling a thickness in a peripheral direction of a bottle. Here too an elliptical blow mould is provided.

U.S. Pat. No. 4,380,526 discloses a device and a method for producing non-cylindrical articles from PET preforms. Blow moulds are used which themselves have an elliptical cross section. The surface of the blow mould against which the thermoplastic material is pressed can have effects on the shaping. For this it is proposed to apply a heat-insulating material in the region which forms the container. This teflon material is intended to improve the coefficient of friction with the plastic material of the plastic preform and reduce a heat transfer from the preform material to the blow mould.

German patent application DE 10 2009 021 792.4 (not yet published) by the applicant describes a method in which the plastic preforms are partially touched by means of a contact element and thus tempered. The disclosure content of this application is hereby fully incorporated by reference in the present disclosure.

Here too the objects of the patent application submitted by the applicant on the same day which concern "preferential heating" are fully incorporated by reference in the present application.

It may be desirable to provide a device which allows or facilitates the production of oval containers.

SUMMARY

According to various aspects of the disclosure, a device for processing, in particular tempering, containers, in particular performs comprises at least one holder device to receive at least one preform, wherein the holder device in some aspects comprises a preform gripper for at least temporary contacting arrangement of at least one wall part of the preform on at least one contact device. With the at least one contact device a temperature of the first wall part can be set which at least temporarily differs from the temperature of a second wall part of the preform that is in some aspects always spaced from the contact device. The contact device is releasably held by a carrier device at least partly forming a receive zone (for the contact device).

This may be advantageous as the contacting arrangement allows the preform or container concerned to be partially tempered very efficiently, whereby again production of an oval container form is advantageously possible. Furthermore the device may have the advantage that because of the releasable connection, different tempering profiles are or can be provided or changed for different containers or container shapes or preforms. Such preforms or containers in some aspects consist of plastic, such as for example PET.

The holder device can be physically fixedly arranged, but it is in some aspects mobile if for example designed in the form of a rotation conveyor, linear conveyor or a combination thereof. The holder device can thus be formed as any arbitrary device for holding preforms or containers and thus for example as a transport unit.

The temperature difference of the contact device in the region of the first wall part in relation to the second wall part is in some aspects adjustable.

In an exemplary embodiment of the present disclosure the carrier device has several outer holder areas i.e., for example, forming part of the surface of the carrier device to hold at least temporarily a contact device for tempering the wall part.

Tempering the wall part or the contacting wall part in some aspects means cooling of the wall part, wherein in some aspects cooling also means only applying slightly less heat than in another area, for example, in an area allocated to the second wall region. Thus the tempering device is in some aspects a device for cooling the first wall part or contacting wall part. The first wall part can extend completely or only partly in the peripheral direction and/or longitudinal direction of the preform. In some aspects the second wall part is superficially larger than the first wall part. The multiplicity of holding zones in some aspects allows movement of the individual holding zones in relation to each other.

This embodiment may be advantageous as it allows construction of a unit, which is easy to produce and easily accessible, from several components.

In an exemplary embodiment of the present disclosure the outer holding zones are at least in sections formed negative to the surface regions of the contact devices, wherein the contact device is in contact with the holding zones with part of its outer surface facing the holding zones, and the inner surface forms a cooling contact contour. The contact device thus has an inner contour part which forms the cooling contact contour, whereby different preforms can be processed using forms specially adapted to the contour of the preforms or containers or bottles.

This embodiment may be advantageous as the broad area cooperation of the outer holding zone or zones and the outer surface of the contact device allows a very defined or precise arrangement and positioning of the individual components to each other, whereby again a very high process accuracy can be achieved which in turn leads to a high throughput and low rejection rate.

In an exemplary embodiment of the present disclosure the outer holding zones and the contact device can be coupled together by means of fast coupling connection(s), for example, they can be connected and/or released manually.

This embodiment may be advantageous as it allows the possibility of rapid exchange of the contact devices, requiring no complex conversion. Thus different contact devices can be inserted or the contact devices exchanged in the shortest time and without need for specialist personnel.

According to an exemplary embodiment of the present disclosure, to form the fast connections the outer holding parts in some aspects each have a sliding section for (for example, linear) guidance of a positioning device of the contact device in a slide direction, or to form the fast connection the contact device has a sliding section to guide a positioning device of the outer holding parts in the slide direction. The sliding section here for example can be formed by a rail-like cooperation of two sliding elements, whereby in each case one sliding element is provided on the contact device and one sliding element on the positioning device, for example in the form of tongue and groove.

This embodiment may be advantageous as it allows a very defined positioning or fixing of the contact device in relation to the positioning device.

According to an exemplary embodiment of the present disclosure, the outer holding parts or the contact devices each have at least one fixing means for fixing the positioning device.

This embodiment may be advantageous as the position of the contact device in relation to the positioning device can be fixed very easily, whereby no undesirable release of the contact device in relation to the positioning device can occur, or any wobble of the contact device in the positioning device is prevented or reduced.

According to an exemplary embodiment of the present disclosure, the outer holding parts or the contact devices each have at least two fixing means spaced apart in the sliding direction for fixing and/or positioning of the positioning device.

This embodiment may be advantageous as it allows a very precise positioning over a substantial length proportion.

According to an exemplary embodiment of the present disclosure the fixing means for fixing are mobile substantially at right angles to the sliding direction. This may be advantageous as it allows a very high force application or induction, whereby a high surface pressure and hence substantial friction connection results between the contact device and the positioning device.

According to an exemplary embodiment of the present disclosure the fixing means for fixing are each formed differently in the region of a surface for contacting the positioning device.

This may be advantageous as it allows a function separation, whereby individual fixing means perform a first task while other fixing means perform a further task. This may be furthermore advantageous as costs can be saved since not all fixing means need be provided with the corresponding production tolerances or properties.

According to an exemplary embodiment of the present disclosure at least one fixing means for fixing in the region of the surface for contacting the positioning device has a structure to create a form fit with the positioning device.

This embodiment may be advantageous as the fixing of the contact device in or on the positioning device can be achieved by a form fit connection instead of or in addition to a friction connection.

According to an exemplary embodiment of the present disclosure in the region of the contact device and/or in the region of the outer holding zones is provided in some aspects at least one channel for guiding a fluid, such as for example a cooling medium. This fluid is in some aspects a liquid but can also be a gas. The fluid in some aspects dissipates heat from the contact device or positioning device by convection.

It is however also conceivable that by means of the fluid heat can be supplied to the contact device and/or positioning device. It is also conceivable that by means of a first fluid heat can be supplied to the positioning device and/or contact device while by means of a second fluid heat can be dissipated from the positioning device and/or contact device. In some aspects furthermore a cooling device is provided for cooling the fluid.

It is furthermore conceivable that a control device is provided to control the fluid flow i.e. for example the flow speed. It is furthermore conceivable that a detection device is provided for detecting device properties or preform properties or container properties, e.g. temperature. It is also conceivable that by means of the detection device an identification of the individual wall parts is possible, for example, the first and second wall parts. It is also conceivable that the preforms, in some aspects if surrounded by the contact device at least in sections, can be rotated about their longitudinal axes by means of an actuator device, in particular a stepper motor.

Further advantages and embodiments will become evident from the attached drawings.

DETAILED DESCRIPTION

Figure 1:
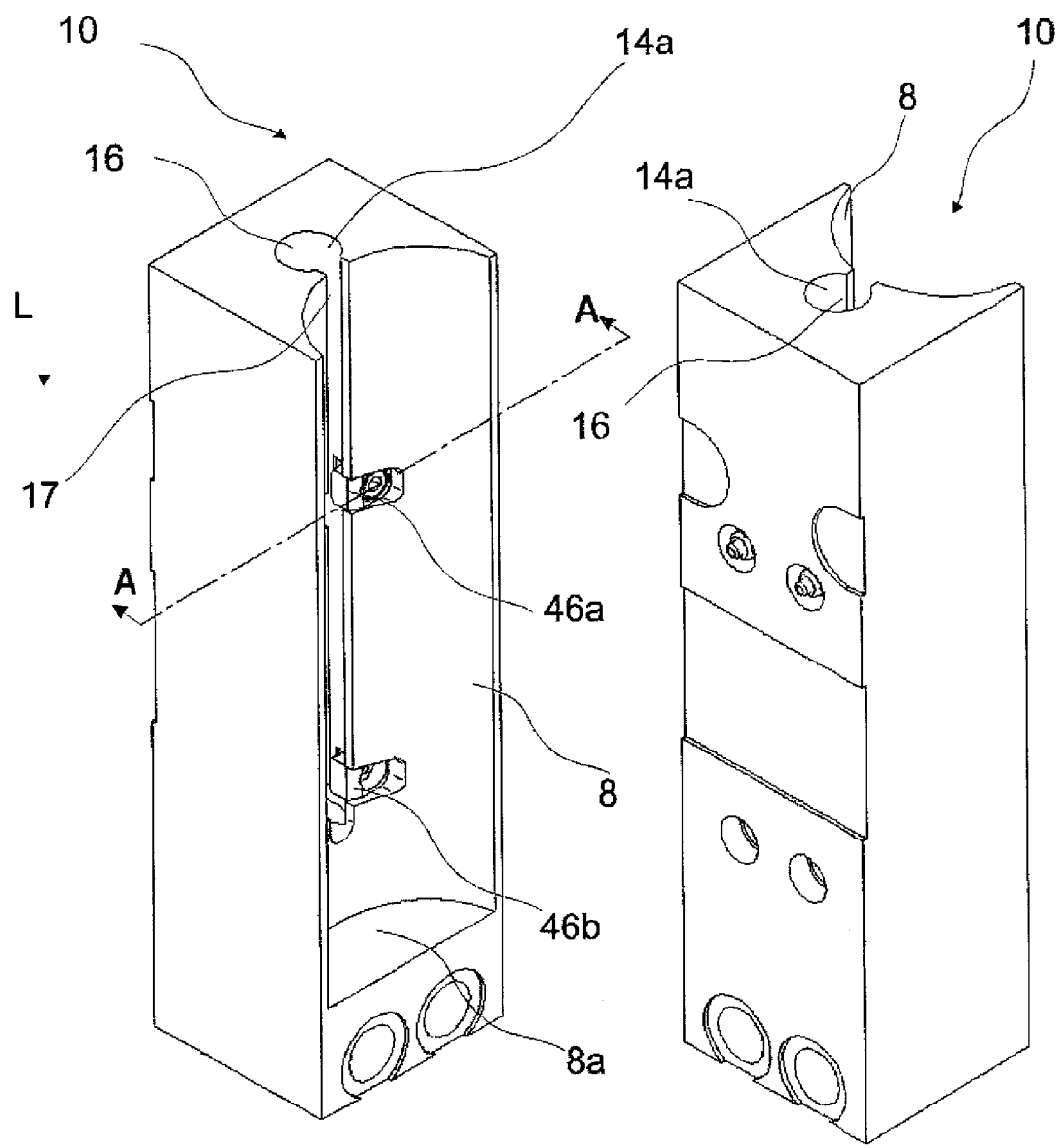
FIG. 1 shows a three-dimensional front and rear view of an exemplary positioning device according to various aspects of the disclosure.

FIG. 1 shows a three-dimensional depiction of a front and a rear view of the carrier device 10 according to the disclosure which can also be called a mould carrier. It is evident from this depiction that the carrier device 10 has holding zones 8. These holding zones 8 are each connected via a slot 17 with a fast coupling connection 14a, 14b. These fast coupling connections 14*a*, 14*b* each form a sliding section 16 in each of which a corresponding element of the contact device (not shown) can be guided in direction L. Reference numerals 46*a*, 46*b* designate clamping elements, in particular clamping claws which serve for fixing or positioning the contact device in relation to the carrier device 10. The carrier device 10 or mould carrier can also be tempered and fitted with a temperature sensor to control the nominal temperature.

Figure 2:
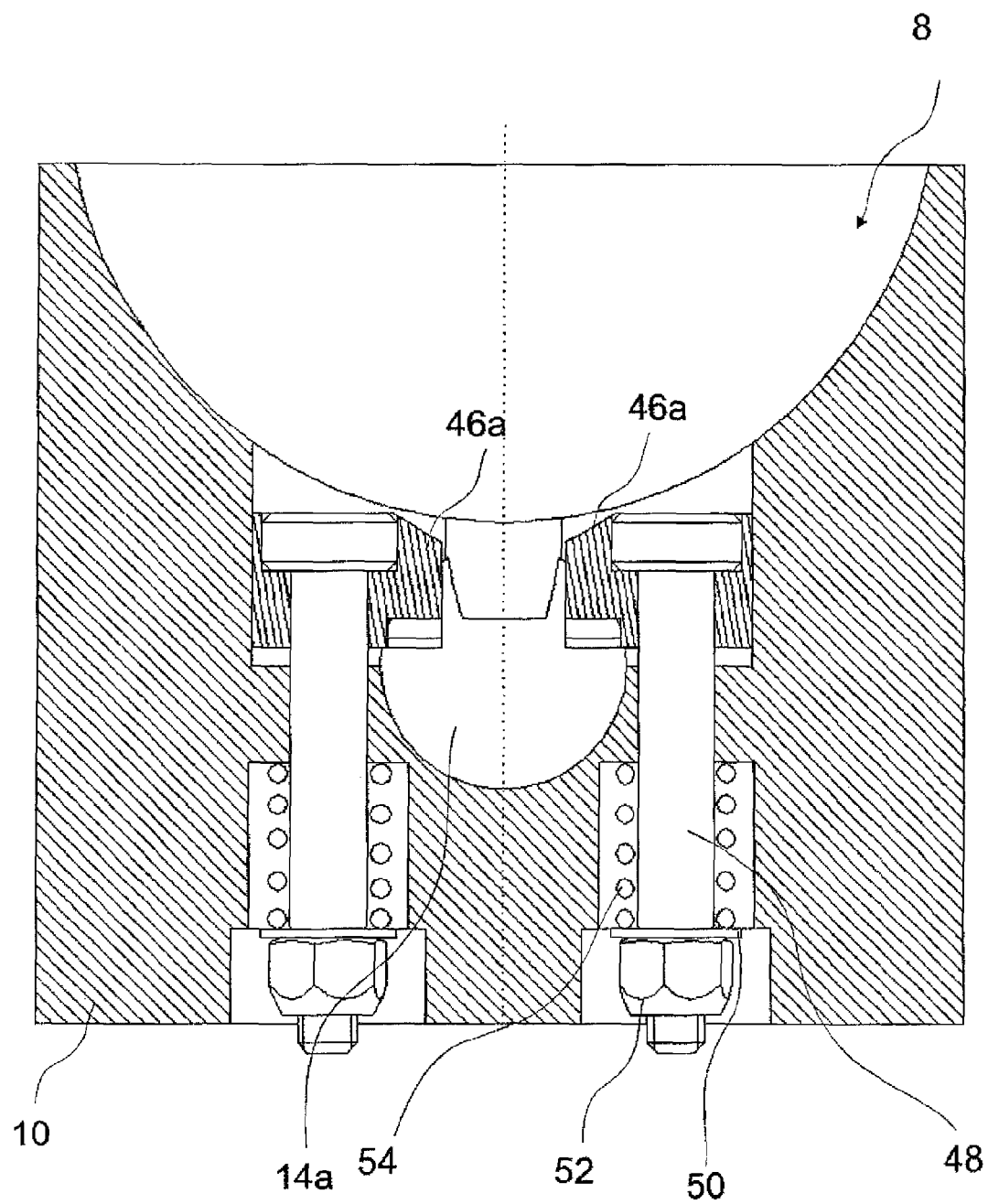
FIG. 2 shows a two-dimensional cross section through an exemplary positioning device according to various aspects of the disclosure.

FIG. 2 shows a two-dimensional cross section view of the carrier device 10 shown in FIG. 1 in the area of section "A". This depiction again shows the holding zone 8 and the fast coupling connection 14*a*. Furthermore clamping bolts 48 are shown for clamping or fixing the clamping claws 46*a*. The clamping bolts 48 are each formed by means of spring elements 54, which are in some aspects designed as coil springs (in particular compression springs), washers 50 and/or nuts 52 to accept spring force. The clamping claws 46 therefore in some aspects are or can be pretensioned with the spring element 54 and particularly in some aspects may lie with their underside in the mould carrier or carrier device 10. Thus on holding the contact device 6, clamping or fixing the contact device 6 in the carrier device 10 is easily possible.

FIG. 3 again shows a two-dimensional view of the carrier device 10. This depiction shows firstly a part of a contact device 6 partly coupled via the fast coupling connection 14*b*. The contact device 6 in some aspects has a positioning device 18, for example, a sliding block.

The areas marked "C" and "D" are each shown enlarged in the section drawings. These section drawings show fixing means 22*a*, 22*b* respectively. The fixing means 22*a*, 22*b* each have surfaces for contact 24*a*, 24*b* with which they are in or can be brought into contact with the sliding block 18 of the fast coupling connection 14*b* of the contact device 6.

It is furthermore clear from the section views "C" and "D" that the surfaces for contact 24*a*, 24*b* are formed differently. Surface 24*a* for example has only a smooth structure, while structure 26 of surface 24*b* is formed rough or corrugated and in particular suitable for creating a form fit. Reference numeral 40 designates in some aspects an outer radius or outer surface of the contact device 6.

The clamping claws 46*a*, 46*b* and fixing means 22*a*, 22*b* are in some aspects designed such that they only come into contact with the sliding block 18 immediately before locking. When the contact device 6 is pressed down for coupling with the positioning device 10, clamping claws 22*b* are pressed by the chamfers and the radius of the sliding block and move back; when pressed further down the clamping claw 22*b* snaps into engagement in the radius of the sliding block 18. The contour of the clamping claw 22*b* is designed such that autonomous detachment is prevented. A contact is produced with the face 41 on the support surface 8*a* in the mould carrier, whereby the end position is defined.

The clamping claw 22*a* and fixing means 22*a* also press on the sliding block 18, whereby the die is also clamped in the upper area. In the clamped state thus the contact device 6 lies defined via its face 42 on the holding zone 8 of the preferably tempered mould carrier 10, whereby a heat transfer from the mould carrier 10 to the contact device 6 is guaranteed.

Figure 4:
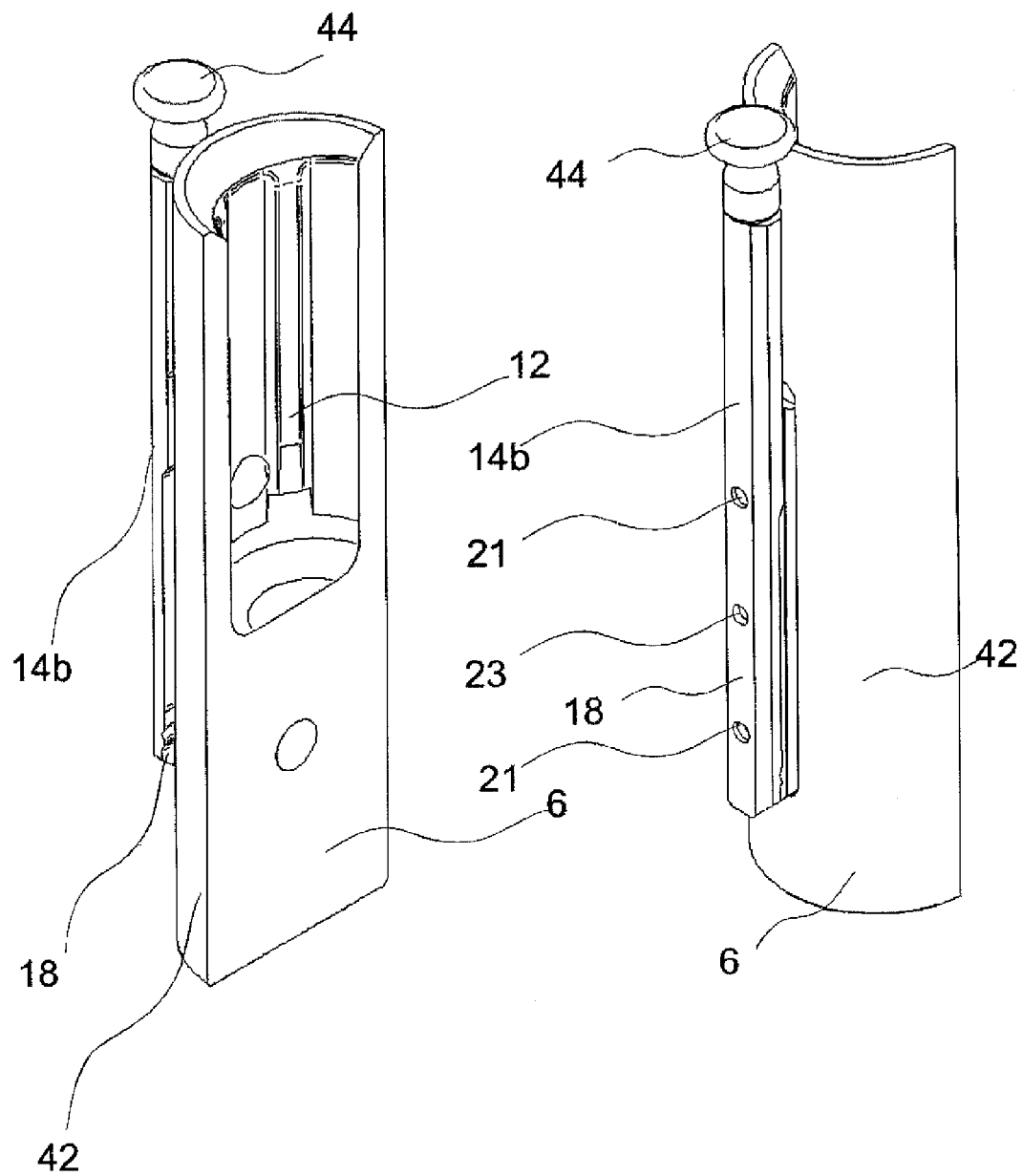
FIG. 4 shows a three-dimensional front view and a three-dimensional rear view of the contact device according to various aspects of the disclosure.

FIG. 4 shows two three-dimensional views of the contact device 6. The three-dimensional view of contact device 6 shown on the left in FIG. 4 shows the inner surface of the contact device 6 and hence the cooling contact contour 12. It is here conceivable that the cooling contact contour 12 extends in a straight line as shown in FIG. 4, wherein it is also conceivable that the cooling contact contour 12 extends in a curve or is curved in sections and touches a wall region of the preform. In some aspects the cooling contact contour 12 optionally consists of a heat-conductive or heat-insulating material to dissipate heat from at least one wall part of the preform 2 or to supply heat in a targeted manner to a wall part. In some aspects for better heat conduction, aluminium can be provided as a material for the cooling contact contour 12, or teflon for better heat insulation. In an exemplary embodiment the cooling contact contour 12 is provided in the form of a composite part.

Thus it would be conceivable for a cooling contact contour to comprise a heat-conductive material and for a further cooling contact contour to comprise a heat-insulating material. It would also be possible for a cooling contact contour to have regions which consist of a heat-conductive material in order to dissipate heat from a wall part of the preform 2 and also regions consisting of a heat-insulating material to supply heat to a wall part of the preform 2.

The fast coupling connection 14*b* arranged on the face 42 of contact device 6 is for example designed as a positioning device 18, in particular as a sliding block. The reference numerals 21 designate screw connections with which the fast coupling connection 14*b* can be connected with the face 42 or wall element of the contact device 6. Reference numeral 23 designates a pin, such as for example a positioning pin.

The handle 44 constitutes a means for applying force to the contact device 6. By means of this handle 44 a release or fixing force can be applied to the contact device 6. The contact device 6 or die 6 is designed in each case for one bottle contour and preform geometry, whereby to change types and reduce the fitting time the contact device 6 is designed for easy and fast exchange.

Figure 3:
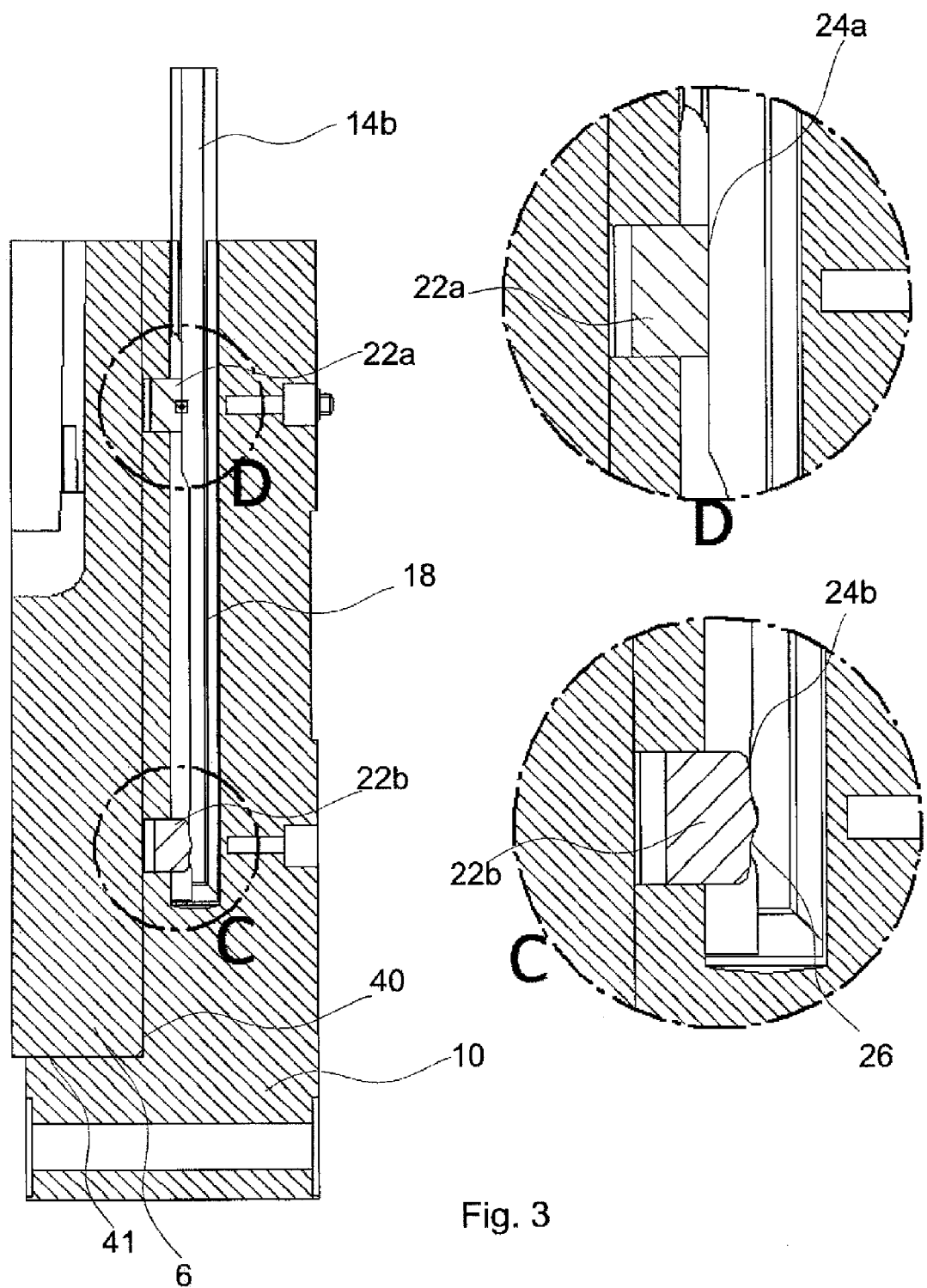
FIG. 3 shows a two-dimensional section view of an exemplary positioning device in which a contact device is inserted, and two detailed depictions of the fixing means.
Figure 5:
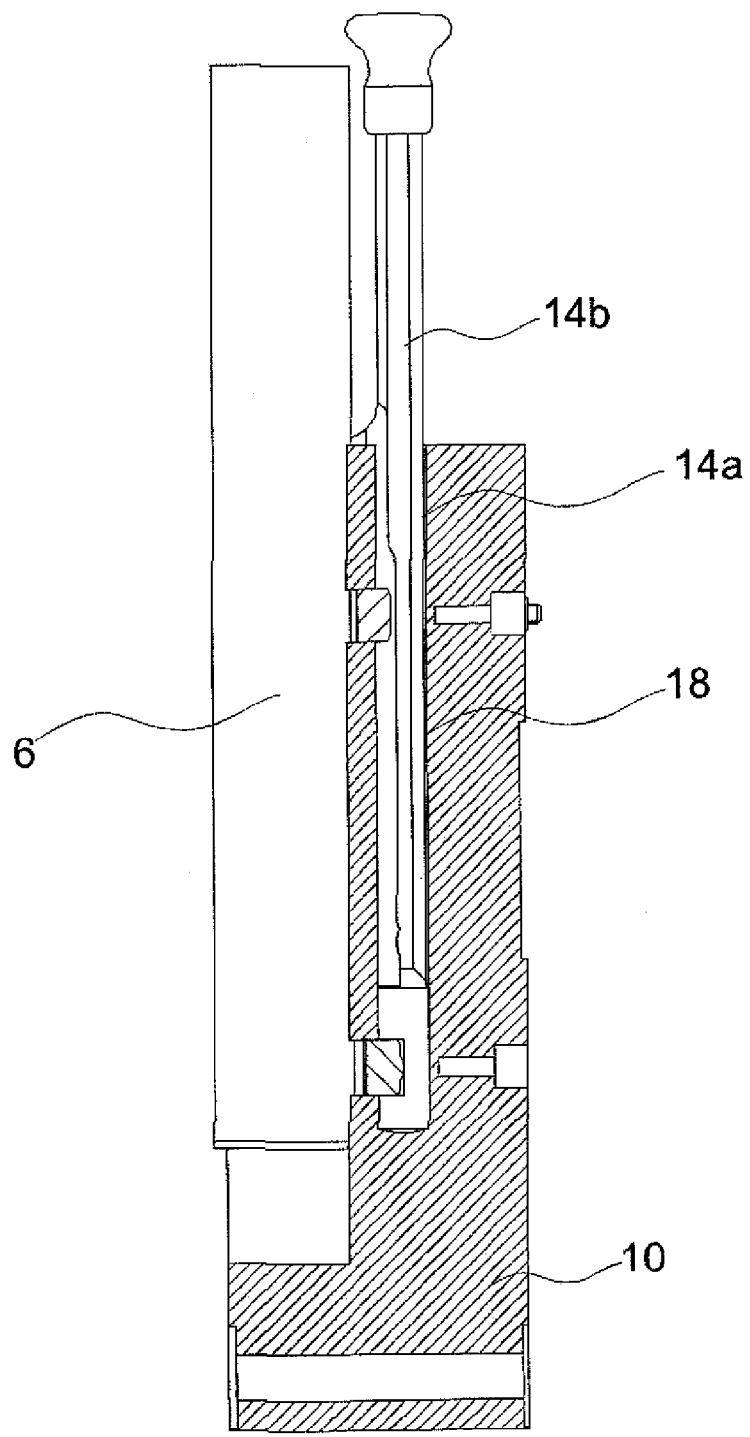
FIG. 5 shows a further cross section view of the positioning device with partially inserted contact device.

FIG. 5 corresponds substantially to FIG. 3, wherein the fast coupling connections 14*b* of the contact device 6 do not yet fully cooperate with the fast coupling connection 14*a* of the carrier device 10.

Figure 6:
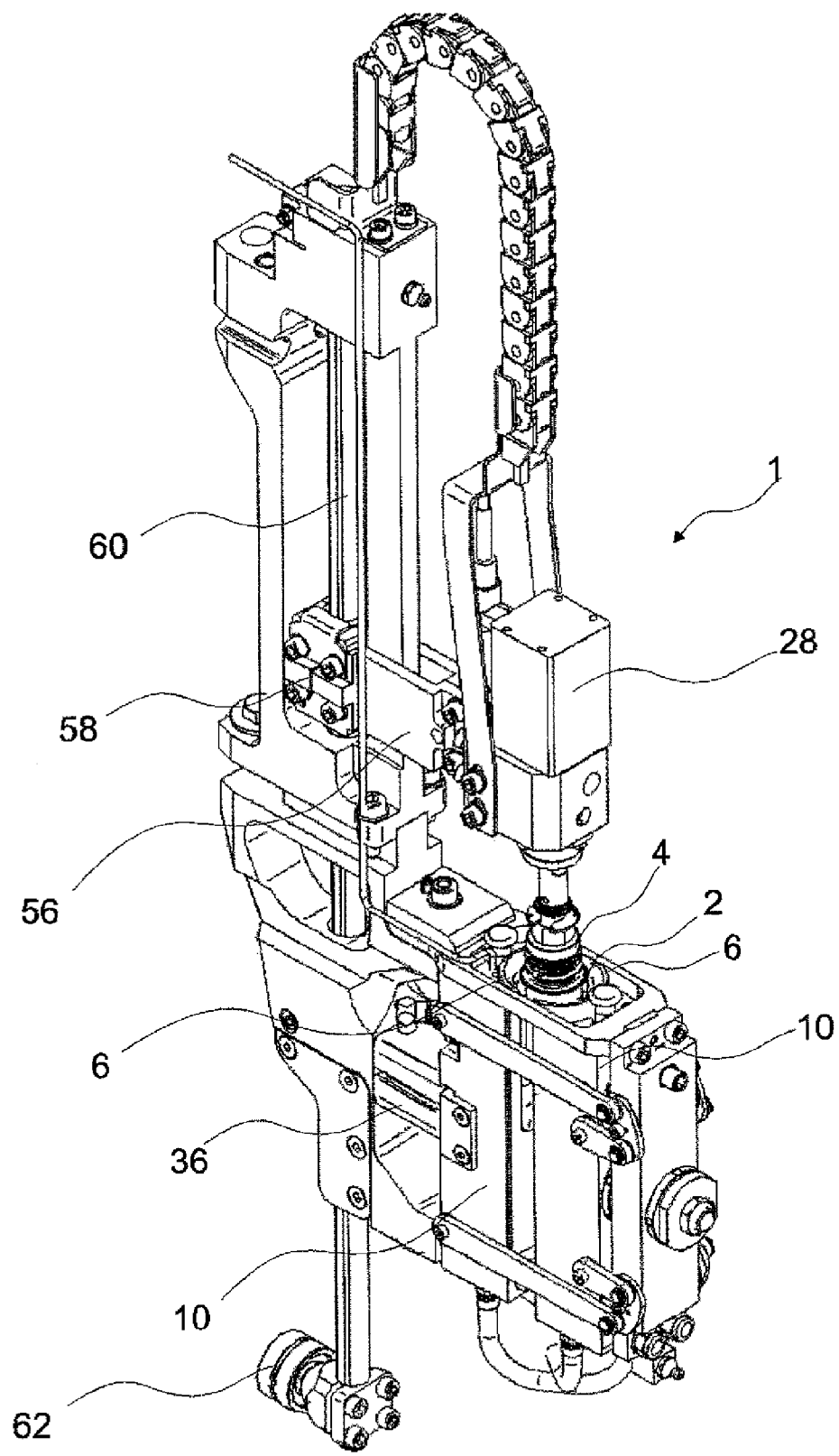
FIG. 6 shows a three-dimensional depiction of part of the container processor device according to various aspects of the disclosure.

FIG. 6 shows part of a device 1 for processing containers in a three-dimensional view. The depiction shows a multiplicity of devices connected together and the supply of a preform 2 by means of a holding device 4, for example a preform gripper, to the contact device 6 which in turn is surrounded by the carrier devices 10. The preform gripper 4 is connected with a stepper motor 28 which is connected with an arm 56, a coupling 58, for example a slip coupling, and a means for forced guidance 60, for example a splined shaft, and can be moved in the preform longitudinal direction by a control curve component 62, in particular a roller running on a control curve.

Figure 7:
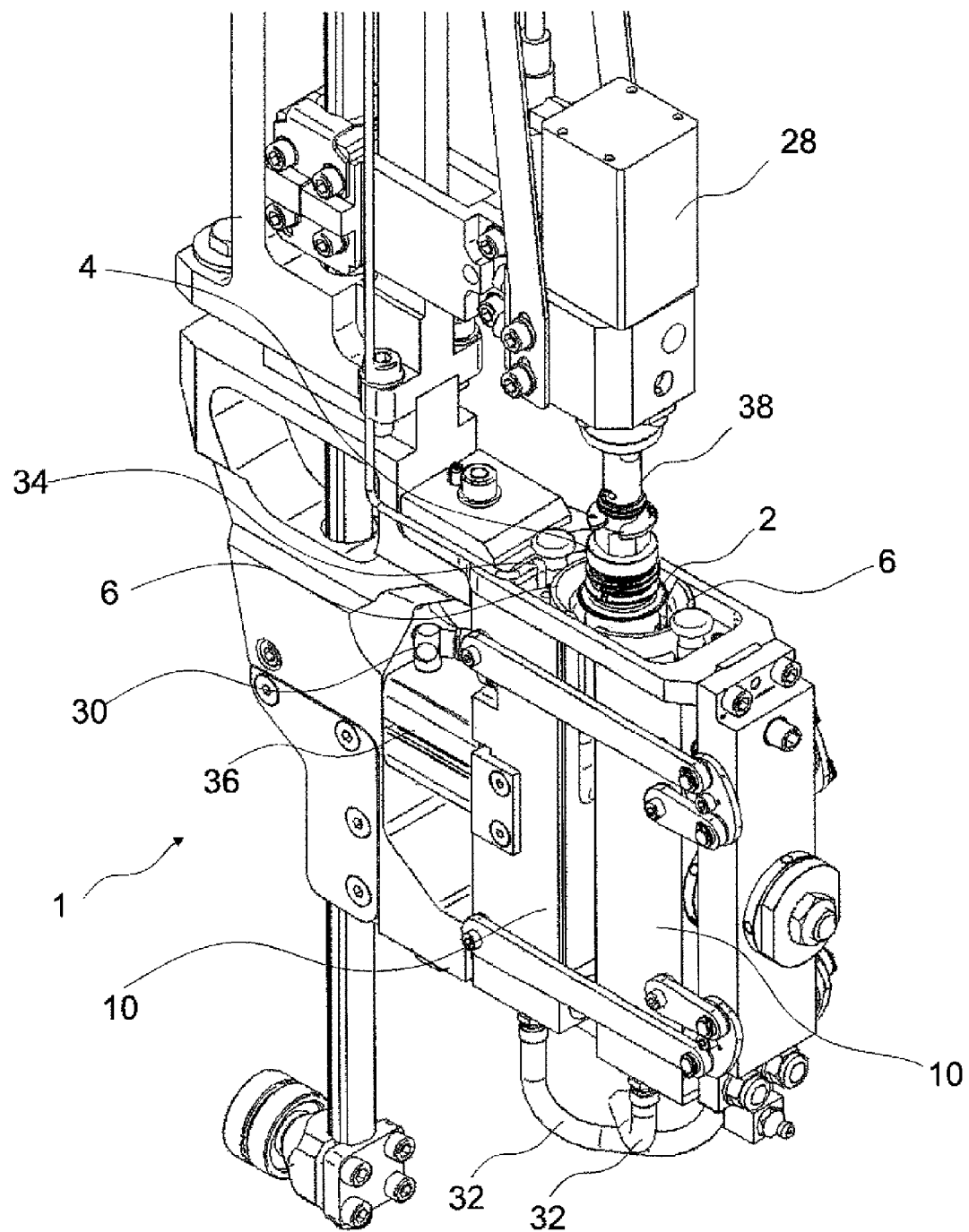
FIG. 7 shows a three-dimensional detailed depiction of a section of the container processing device shown in FIG. 6.

FIG. 7 shows an enlarged three-dimensional view of part of the processing device 1 already shown in FIG. 6. This figure shows one or more additional connections 30 for supply of a tempering medium to the carrier 10 and deflector elements 32 for deflecting the tempering medium. The deflector elements can connect respectively the individual carrier devices 10 and/or contact device 6 together fluidically.

Reference numeral 34 designates a thermosensor and hence a detector unit. The thermosensor 34 can for example serve to determine the fluid temperature, the temperature of the carrier device 10 of the contact device 6 and/or the temperature of the preform 2. It is also conceivable that further detection devices are provided for example to detect the position of the preform 2 and/or to determine ambient conditions such as for example relative humidity, pressure or similar.

The preform gripper 4 can for example be held via a bayonet lock. On a change, the preform gripper 4 is unscrewed from the holder 38 for example by twisting counter-clockwise. On a change, stepper motor 28 can be powered up to hold the spindle in position.

Reference numeral 36 designates a cylinder or further stepper motor by which for example the movement of the carrier devices 10 in relation to each other can be achieved.

It will be apparent to those skilled in the art that various modifications and variations can be made to the device for processing preforms of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A tempering device, comprising:
  a holder device configured to hold at least one preform, the at least one preform having an inner wall part and an outer wall part; and
  a mould carrier device adapted to releasably hold a contact device,
    the mould carrier device having a holding zone adapted to hold the contact device,
    connections to the carrier adapted to supply a tempering medium to the carrier,
    a thermosensor adapted to determine a temperature of the tempering medium, the carrier device and/or the preform,
    the contact device being at least partially radially surrounded by the carrier device and positioned radially outward from the preform, said contact device including a contact contour extending in one of a straight line along a longitudinal direction of the at least one preform, or extending in a curve and is curved in sections along the longitudinal direction of the at least one preform and touching a first wall part of the at least one preform,
    the holder device being separate from the contact device at least in a closed state and being adapted to hold the first wall part of said at least one preform in at least partial contacting arrangement with the contact contour of said contact device while a second wall part of said preform is longitudinally spaced from the first wall part, wherein the first wall part and the second wall part correspond to a portion of the outer wall facing the contact contour,
    the contact contour being adapted to prespecify a temperature of the first wall part, wherein the temperature of the first wall part at least temporarily differs from a temperature of the second wall part that is always spaced from the contact contour,
    wherein the carrier device comprises a plurality of outer holding zones, each outer holding zone being adapted for holding at least temporarily and at least partially radially surrounding a contact device for tempering the wall part, and
    further comprising coupling connections adapted for coupling the outer holding zones and the contact devices wherein the coupling connections comprise a sliding section within the outer holding zone, wherein the sliding section is an indented portion within the outer holding zone, a plurality of spring loaded bolts spanning into the sliding section, a clamping element located at an end of each bolt within the sliding section adapted to pretension a positioning device, and wherein the sliding section and the clamping elements are adapted to guide the positioning device of the contact device vertically from a lower opening of the sliding section located on a lower end of the carrier device to an upper end of the sliding section located on an upper end of the carrier device.

2. The device according to claim 1, wherein the outer holding zones at least in sections are formed negative to the contact device, wherein the contact device is in contact with the holding zones with part of its outer surface facing the holding zones and an inner surface of the contact device forms being adapted to form a cooling contact contour.

3. The device according to claim 1, wherein either the outer holding zones or the contact devices each comprise at least one tongue and groove fastener adapted for fixing the positioning device into a position.

4. The device according to claim 3, wherein either the outer holding zones or the contact devices each comprise at least two tongue and groove fasteners adapted for fixing the position of the positioning device, wherein the at least two tongue and groove fasteners are spaced apart in the slide direction.

5. The device according to claim 3, wherein the tongue and groove fasteners are movable substantially at right angles to the slide direction.

6. The device according to claim 3, wherein the tongue and groove fasteners are each formed differently in an area of a surface for contacting the positioning device.

7. The device according to claim 5, wherein either the outer holding zones or the contact devices each comprise a structure adapted to create a form fit connection with the positioning device.

8. The device according to claim 1, wherein at least one of an area of the contact device and an area of the outer holding zones includes at least one channel adapted to guide a fluid.

9. A device for tempering device, comprising:
  a holding device adapted to hold at least one preform, the at least one preform having an inner wall part and an outer wall part;
  a mould carrier device adapted for releasably holding a contact device, the carrier device comprising:
    a holding device separate from the contact device at least in a closed state, the carrier device having a holding zone adapted to hold the contact device, the contact device being at least partially radially surrounded by the carrier device, and positioned radially outwardly from the preform;
    connections to the carrier adapted for supplying a tempering medium to the carrier,
    a thermosensor adapted for determining a temperature of the tempering medium, the carrier device and/or the preform,
  a contact contour that extending in one of a straight line along a longitudinal direction of the at least one preform, or extending in a curve and is curved in sections along the longitudinal direction of the at least one preform and touching a first wall part of the at least one preform; and
  a plurality of outer holding zones, each outer holding zone adapted for holding at least temporarily a contact device at least partially radially surrounding a contact device for tempering the first wall part; and coupling connections adapted for coupling the outer holding zones and the contact device, wherein the coupling connections comprise a sliding section within the outer holding zone, wherein the sliding section is an indented portion within the outer holding zone, a plurality of spring loaded bolts spanning into the sliding section, a clamping element located at an end of each bolt within the sliding section adapted to pretension a positioning device of the contact device vertically from a lower opening of the sliding section located on a lower end of the carrier device to an upper end of the sliding section located on an upper end of the carrier device, wherein:

the holder device is adapted to hold the first wall of said at least one preform in at least partial contact with the contact contour of said contact device while a second wall part of said preform is longitudinally spaced from the first wall part, wherein the first wall part and the second wall part correspond to a portion of the outer wall facing the contact contour; and the contact contour is adapted to prespecify a temperature of the first wall, wherein the temperature of the first wall is distinct from a temperature of the second wall, the second wall being spaced from the contact contour.

10. The device of claim 9, wherein the first wall and the second wall directly face the contact contour.

11. The device of claim 9, wherein the contact device is a tempering form.

12. The device of claim 1, wherein the first wall and the second wall directly face the contact contour.

\* \* \* \* \*

UNITED STATES PATENT AND TRADEMARK OFFICE
CERTIFICATE OF CORRECTION

PATENT NO. : 9,956,713 B2  
APPLICATION NO. : 13/227463  
DATED : May 1, 2018  
INVENTOR(S) : Gerald Huettner Page 1 of 1

It is certified that error appears in the above-identified patent and that said Letters Patent is hereby corrected as shown below:

In the Claims

Claim 9, Column 8, Line 58 "a contact contour that extending" should be -- a contact contour extending --

Claim 9, Column 8, Line 66 "a contact device at least" should be -- a contact device and at least --

Signed and Sealed this  
Seventh Day of May, 2019

Andrei Iancu  
*Director of the United States Patent and Trademark Office*